R. WHITE.
Revolver.
No. 1,559.
Reissued Oct. 27, 1863
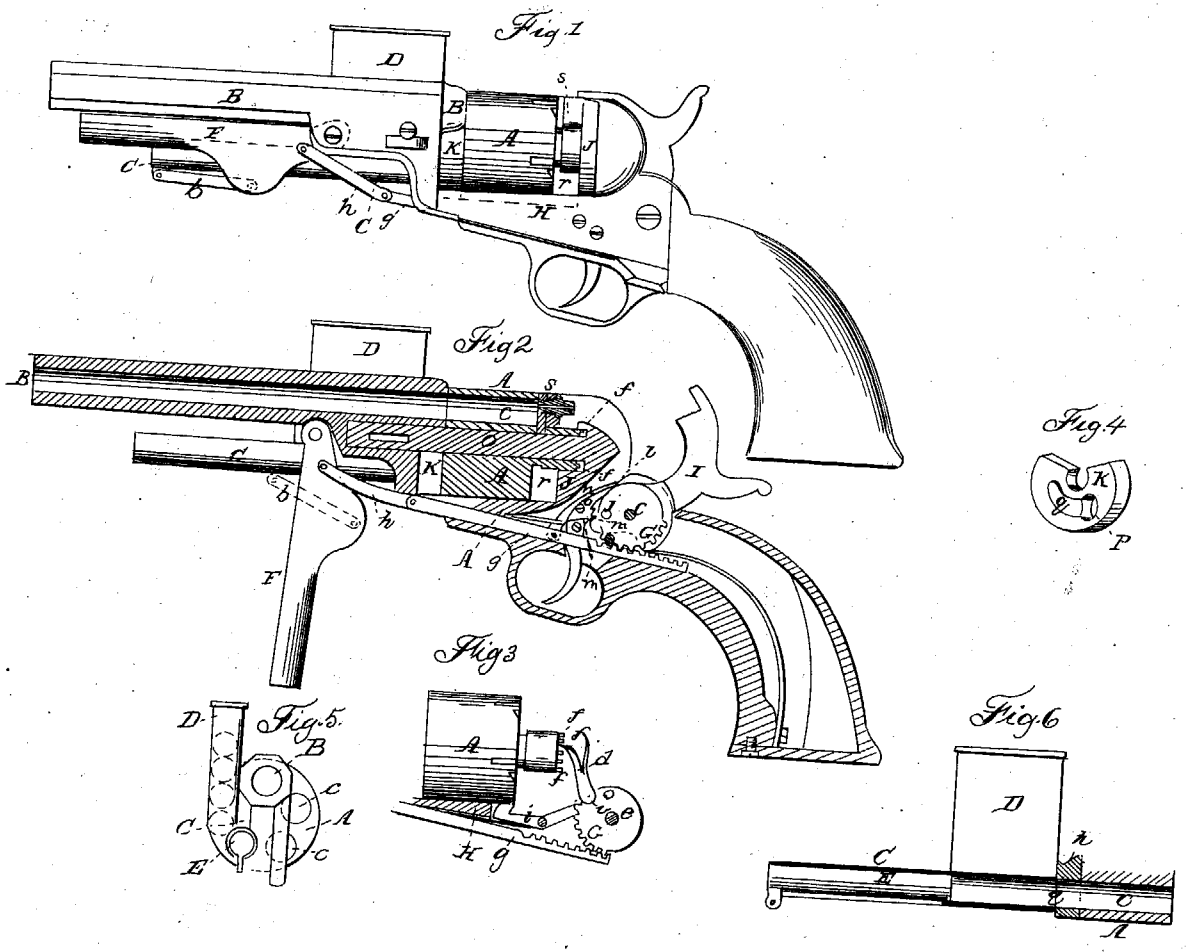
Witnesses
J. W. Coombs
Scott Reed
Inventor.
Rollin White
per Munn & Co.
N. PETERS, PHOTO-LITHOGRAPHER, WASHINGTON, D. C.

UNITED STATES PATENT OFFICE.

ROLLIN WHITE, OF SPRINGFIELD, MASS., (LATE OF HARTFORD, CONN.)

IMPROVEMENT IN REPEATING FIRE-ARMS.

Specification forming part of Letters Patent No. 12,649, dated April 3, 1855; Reissue No. 1,559, dated October 27, 1863.

*To all whom it may concern:*

Be it known that I, ROLLIN WHITE, formerly of the city and county of Hartford, and State of Connecticut, now of Springfield, in the county of Hampden and State of Massachusetts, have invented certain new and useful Improvements in Repeating Fire-Arms; and I do hereby declare that the following is a full, clear, and exact description of the same, reference being had to the accompanying drawings, forming part of this specification, in which—

Figure 1 is a side view of a pistol constructed according to my invention. Fig. 2 is a central longitudinal vertical section of the same. Fig. 3 is a side view of the mechanism by which the rotation of the breech and locking and unlocking of it are effected. Fig. 4 is a perspective view of a guard-plate used in front of the cylinder, showing its inner face. Fig. 5 is a front view of the magazine and charger. Fig. 6 is a longitudinal section of the charger.

Similar letters of reference indicate corresponding parts in the several figures.

This invention consists in a certain method of applying and arranging a cartridge-magazine and charger in connection with the rotating cylinder of a fire-arm, for the purpose of charging the chambers of the cylinder as they, by the rotation of the cylinder, are severally brought to a suitable position.

It consists, also, in combining the rotating cylinder with the charger in such manner that by the operation of drawing back the charger, after charging a chamber of the cylinder, the cylinder shall be rotated to the extent required.

It consists, also, in combining the hammer with the charger in such a way that by the operation of moving the charger to drive a charge into the chamber the hammer is raised to cock the lock.

To enable others skilled in the art to make and use my invention, I will proceed to describe its construction and operation.

A is the rotating cylinder, having cylindrical chambers *c c* bored entirely through it in a longitudinal direction. *a* is the axis-pin, upon which the cylinder rotates. B is the stationary barrel, attached rigidly to the frame of the arm. S is the separate or detached breech, made separate from the cylinder. This detached breech may be variously constructed and applied. It is shown in the drawings as projecting forward from a stationary recoil-shield, J, of which it forms a part or to which it is rigidly attached, and it is represented as only large enough to cover the rear opening of any one of the chambers *c c* which happens at any time to be opposite to and in line with the barrel.

The combination of cylindrical chambers, stationary barrel, and detached breech may be applied in fire-arms loading from the front or to those loading from the rear of the cylinder.

D is the cartridge-magazine, consisting of a box of such length and width as to contain cartridges placed one upon another. It is attached to one side of the stationary barrel B, close in front of the cylinder, in such a position that the cartridges within it are arranged parallel with the barrel. It opens at the bottom into the charging-tube C, (see particularly Figs. 5 and 6,) which stands parallel with the barrel in such a position that one chamber of the cylinder is opposite to it when another is opposite the barrel. This tube C is of such diameter as to allow the cartridges to slide easily within it, and it extends some distance forward of the magazine. It contains a charging-piston or charger, E, which is attached by a link, *b*, to a lever, F, pivoted under the barrel. This lever, when thrown up close under the barrel, as shown in Fig. 2, draws the piston forward, as shown in Fig. 6, far enough to permit a cartridge to drop from the magazine into the charging-tube; and when the lever is pulled down, as shown in Fig. 2, it drives the piston backward far enough to make it drive the cartridge from the tube into the opposite chamber *c* of the cylinder.

The cartridges may be allowed to drop into the tube by gravitation, or forced into it downward or sidewise by a spring applied to the cover of the magazine. The magazine and charging-tube may be arranged in front of or in rear of the cylinder, as the chambers, which are cylindrical, may be loaded from the front or rear. A similar magazine may be used for percussion-caps or other priming.

The cylinder receives rotary motion from a spring-tooth, *d*, attached by a pin, *v*, to a toothed wheel or sector, G, which turns freely upon the arbor *e* of the hammer I, but which is perfectly independent of the hammer, the said tooth *d* being caused to act on teeth *f f* on the rear of the cylinder, as shown in Fig. 3, in substantially the same way as the tooth attached in other revolving fire-arms to the tumbler, for the purpose of rotating the cylinder by the cocking of the hammer.

The wheel or sector G is moved for the purpose of operating the tooth *d* by means of a toothed rack on a rod, *g*, which slides through the lock-plate or lower part, H, of the frame, and is connected, as shown in Fig. 2, by a link, *h*, with the lever F. When the lever F is thrown down to drive back the charging-piston, and thereby drive a cartridge into a chamber of the cylinder, the wheel or sector G moves in the direction of the arrows shown upon it in Fig. 2, and the spring-tooth *d* slides downward over one of the teeth *f f* without moving the cylinder; but when the lever is thrown up again to draw back the piston, the sector moves in the direction of the arrow shown upon it in Fig. 3, and the tooth *d* engages with one of the teeth *f f* and rotates the cylinder the proper distance to bring opposite to the barrel a chamber which has been previously charged.

The cylinder is locked in the proper position during the discharge by a catch-lever, *i*, (see Fig. 3,) which engages in one of a series of notches in the periphery of the cylinder. This catch-lever is operated upon to unlock the cylinder previously to its rotation by means of a pin, *j*, attached to the wheel or sector G.

This resembles the mode of locking and unlocking the cylinder in some other revolving fire-arms, except that the pin *j* in those fire-arms is attached to the tumbler or hammer.

The cocking of the lock is effected during the operation of charging the chamber by means of a tooth, *k*, (see Fig. 2,) which is attached to the rack-rod *g*, and which, as the rack-rod is moved back by the lever F, engages with a tooth, *l*, on the tumbler or hammer, or in a notch in the same, and thus raises or throws back the hammer till the trigger *m* falls into the sear *n*. When the lever F is thrown up to draw forward the charging-piston and rotate the cylinder, the tooth *k* is drawn out of the way of the tumbler, supported as it moves upon a fixed pin, *o*, inserted transversely in the lock plate or frame H.

The front ends of the chambers, except that one which happens to be in line with the barrel and that which is at the same time in line with the charging-tube, are represented as closed by a guard-plate, K, which fits close up to the front of the cylinder, and prevents the cartridges which are in the cylinder from dropping out in a forward direction. This plate may be of various forms; but when used in connection with a magazine in front of the cylinder, I prefer to make it of the form shown in Fig. 4, where *p* represents a hole made for the cartridge to pass through on its way from the magazine to the barrel. On the inner face of this guard-plate there is an inclined groove, *q*, (see Fig. 4,) leading from one side of the hole *p* in a circular direction concentric with the cylinder. The cartridge, after having been inserted into the cylinder by the charger or piston E, is caused by the rotation of the cylinder to follow the line of this groove, and if any portion of it remains protruding through the front of the cylinder it is driven in by the inclination of the bottom of this groove.

One object of the guard-plate is the prevention of the discharge of the balls by any accidental explosion of the charges in the chambers which are not in line with the barrel. Should any such explosion take place, the space *r*, which is found between the cylinder and all parts of the face of the recoil-shield not occupied by the projecting breech-piece S, provides for the escape of the fire and gases of the exploded charge.

What I claim as my invention, and desire to secure by Letters Patent, is—

1. The arrangement of the magazine and charging-tube, substantially as herein described, for supplying cartridges to the chambers, as set forth.

2. Combining the rotating chambered cylinder with the charging-piston, or its equivalent, in the manner substantially as herein set forth, whereby, in the operation of retracting the said piston, or equivalent, after charging a chamber of the cylinder the cylinder shall be rotated to the extent required to bring a new chamber in line with the barrel.

3. Combining the hammer with the charging-piston in the manner substantially as herein described, so that by the operation of moving the charging-piston to drive a cartridge from the magazine into the chamber the hammer shall be raised to cock the lock, as set forth.

ROLLIN WHITE.

Witnesses:
WM. K. BAKER,
J. M. COOLEY.